United States Patent
Sun et al.

(10) Patent No.: US 9,368,134 B1
(45) Date of Patent: Jun. 14, 2016

(54) METHOD AND SYSTEM FOR PROVIDING AN ANTIFERROMAGNETICALLY COUPLED WRITER

(71) Applicant: Western Digital (Fremont), LLC, Fremont, CA (US)

(72) Inventors: Ming Sun, Pleasanton, CA (US); Dehua Han, Fremont, CA (US); Jose A. Medina, Pleasanton, CA (US); Ming Jiang, San Jose, CA (US); Ying Hong, Los Gatos, CA (US); Feng Liu, San Ramon, CA (US); Jian X. Shen, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 788 days.

(21) Appl. No.: 13/769,951

(22) Filed: Feb. 19, 2013

Related U.S. Application Data

(62) Division of application No. 12/970,423, filed on Dec. 16, 2010, now Pat. No. 8,441,756.

(51) Int. Cl.
  *G11B 5/187* (2006.01)
(52) U.S. Cl.
  CPC .................................... *G11B 5/187* (2013.01)
(58) Field of Classification Search
  CPC ......... G11B 5/187; G11B 5/851; C23C 14/14
  USPC ...................................................... 204/192.2
  See application file for complete search history.

(56) References Cited

U.S. PATENT DOCUMENTS

| | | | |
|---|---|---|---|
| 5,621,592 A | 4/1997 | Gill et al. |
| 5,750,275 A | 5/1998 | Katz et al. |
| 5,838,521 A | 11/1998 | Ravipati |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |

(Continued)

OTHER PUBLICATIONS

Final Office Action dated Oct. 3, 2014 from U.S. Appl. No. 12/976,916, 100 pages.

(Continued)

*Primary Examiner* — John Brayton

(57) ABSTRACT

A method and system for fabricating a magnetic transducer are described. The magnetic transducer includes a pole and a nonmagnetic intermediate layer adjacent to the pole. The pole has a paddle and a pole tip including a plurality of sidewalls. The pole includes a first magnetic pole layer, at least one antiferromagnetic coupling (AFC) structure on the first magnetic pole layer, and a second magnetic pole layer on the AFC structure(s). At least a portion of the first magnetic pole layer resides on the sidewalls of the pole tip. The paddle has a paddle width in a track width direction. The pole tip has a pole tip width in a track width direction that is less than the paddle width.

10 Claims, 11 Drawing Sheets

(56) References Cited

U.S. PATENT DOCUMENTS

| | | | |
|---|---|---|---|
| 6,078,479 A | 6/2000 | Nepela et al. |
| 6,081,499 A | 6/2000 | Berger et al. |
| 6,087,027 A | 7/2000 | Hoshiya et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,259,583 B1 | 7/2001 | Fontana, Jr. et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,292,334 B1 | 9/2001 | Koike et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,358,635 B1 | 3/2002 | Min et al. |
| 6,359,779 B1 | 3/2002 | Frank, Jr. et al. |
| 6,369,983 B1 | 4/2002 | Hong |
| 6,373,667 B1 | 4/2002 | Han et al. |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,437,949 B1 | 8/2002 | Macken et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,456,467 B1 | 9/2002 | Mao et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,496,335 B2 | 12/2002 | Gill |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,628,478 B2 | 9/2003 | Gill |
| 6,629,357 B1 | 10/2003 | Akoh |

(56) References Cited

U.S. PATENT DOCUMENTS

| | | |
|---|---|---|
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,796 B2 | 9/2004 | Shukh et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,818,330 B2 | 11/2004 | Shukh et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,927,952 B2 | 8/2005 | Shimizu et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,823 B2 | 11/2005 | Nakamoto et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,487 B2 | 5/2006 | Terunuma |
| 7,046,490 B1 | 5/2006 | Ueno et al. |
| 7,054,113 B1 | 5/2006 | Seagle et al. |
| 7,057,853 B2 | 6/2006 | Okada et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,723 B2 | 1/2007 | Taguchi |
| 7,170,725 B1 | 1/2007 | Zhou et al. |
| 7,177,117 B1 | 2/2007 | Jiang et al. |
| 7,180,712 B1 | 2/2007 | Li et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,309 B1 | 1/2008 | Wiesen et al. |
| 7,333,295 B1 | 2/2008 | Medina et al. |
| 7,337,530 B1 | 3/2008 | Stoev et al. |

(56) References Cited

U.S. PATENT DOCUMENTS

| | | |
|---|---|---|
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,574 B2 | 6/2008 | Li et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,426,091 B2 | 9/2008 | Okada et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,446,979 B2 | 11/2008 | Jayasekara |
| 7,457,080 B2 | 11/2008 | Watabe et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,394 B2 | 6/2009 | Sasaki et al. |
| 7,551,406 B1 | 6/2009 | Thomas et al. |
| 7,552,523 B1 | 6/2009 | He et al. |
| 7,554,765 B2 | 6/2009 | Shukh et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,606,007 B2 | 10/2009 | Gill |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,773,341 B2 | 8/2010 | Zhang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |

(56) References Cited

U.S. PATENT DOCUMENTS

| | | |
|---|---|---|
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,402,635 B2 | 3/2013 | Degawa et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2001/0043446 A1 | 11/2001 | Barlow et al. |
| 2002/0149886 A1 | 10/2002 | Gill |
| 2004/0120074 A1 | 6/2004 | Okada et al. |
| 2005/0013044 A1 | 1/2005 | Hirata et al. |
| 2006/0044682 A1 | 3/2006 | Le et al. |
| 2006/0109592 A1 | 5/2006 | Watanabe et al. |
| 2006/0119981 A1 | 6/2006 | Li et al. |
| 2007/0019341 A1 | 1/2007 | Mizuno et al. |

(56) References Cited

U.S. PATENT DOCUMENTS

| | | |
|---|---|---|
| 2008/0013221 A1 | 1/2008 | Ohta et al. |
| 2009/0052092 A1 | 2/2009 | Zhou et al. |
| 2009/0168240 A1 | 7/2009 | Hsiao et al. |
| 2009/0174971 A1 | 7/2009 | Tsuchiya et al. |
| 2009/0279213 A1 | 11/2009 | Wu et al. |
| 2010/0079917 A1 | 4/2010 | Miyauchi et al. |
| 2010/0290157 A1 | 11/2010 | Zhang et al. |
| 2011/0086240 A1 | 4/2011 | Xiang et al. |
| 2011/0097601 A1 | 4/2011 | Bai et al. |
| 2011/0273802 A1 | 11/2011 | Zhou et al. |
| 2012/0087046 A1 | 4/2012 | Yanagisawa et al. |
| 2012/0111826 A1 | 5/2012 | Chen et al. |
| 2012/0134057 A1 | 5/2012 | Song et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Dehua Han, et al., U.S. Appl. No. 12/976,916, filed Dec. 22, 2010, 44 pages.

Office Action dated Apr. 3, 2012 from U.S. Appl. No. 12/970,423, 7 pages.

Notice of Allowance dated Jul. 25, 2012 from U.S. Appl. No. 12/970,423, 7 pages.

Notice of Allowance dated Oct. 25, 2012 from U.S. Appl. No. 12/970,423, 11 pages.

Supplemental Allowance dated Apr. 15, 2013 from U.S. Appl. No. 12/970,423, 6 pages.

ABS View
Plan View

Plan View

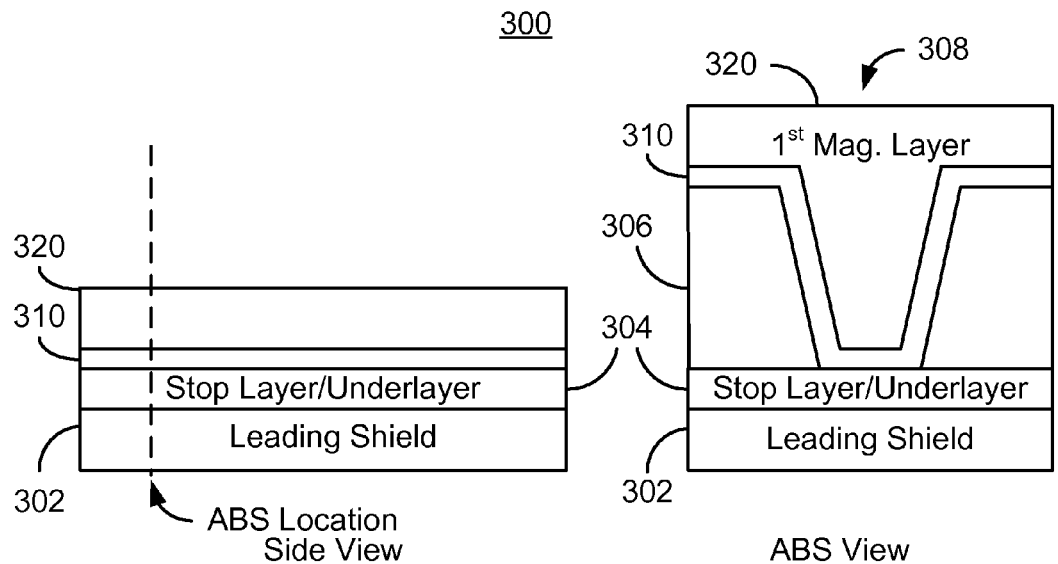
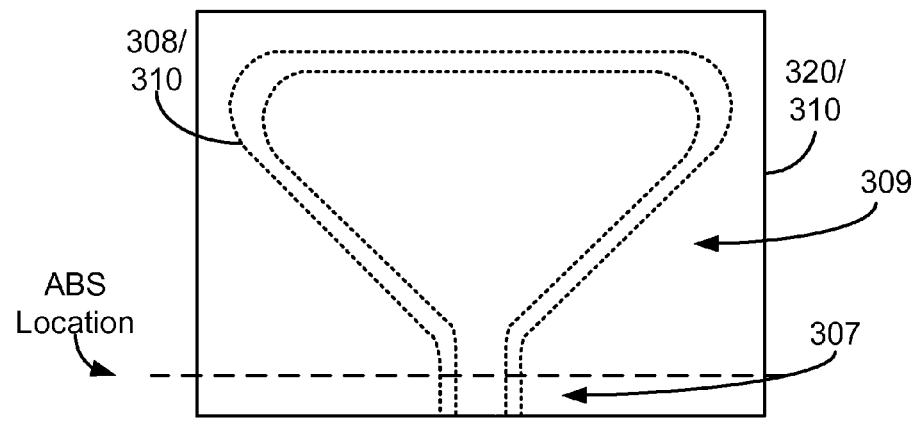
Plan View
FIG. 12

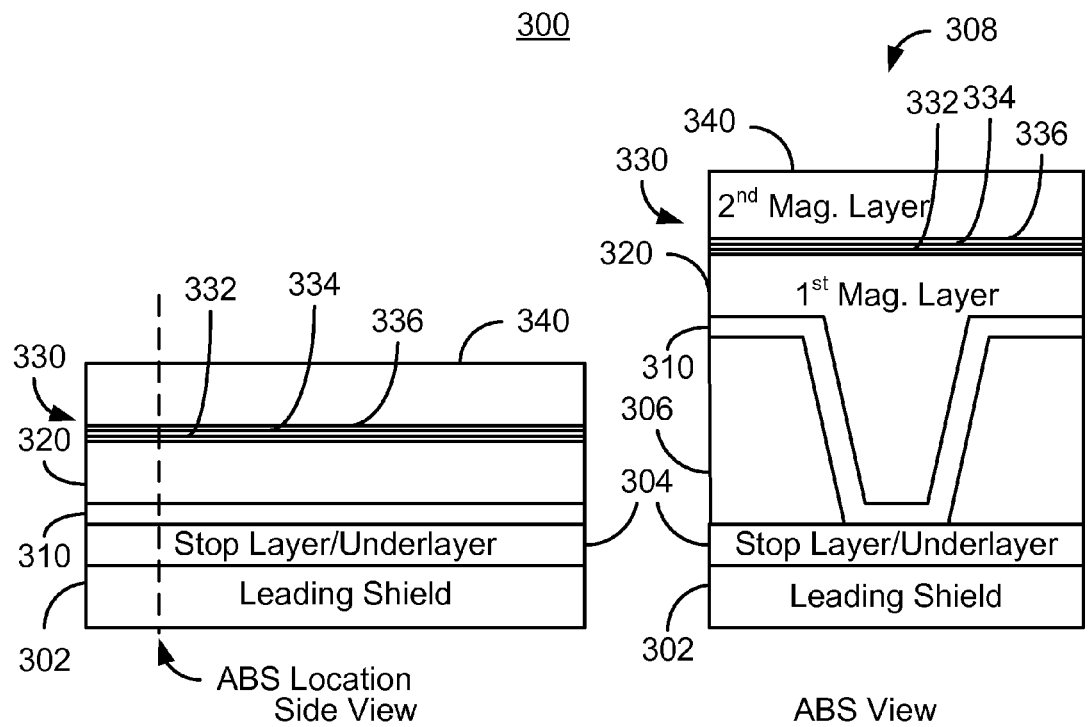
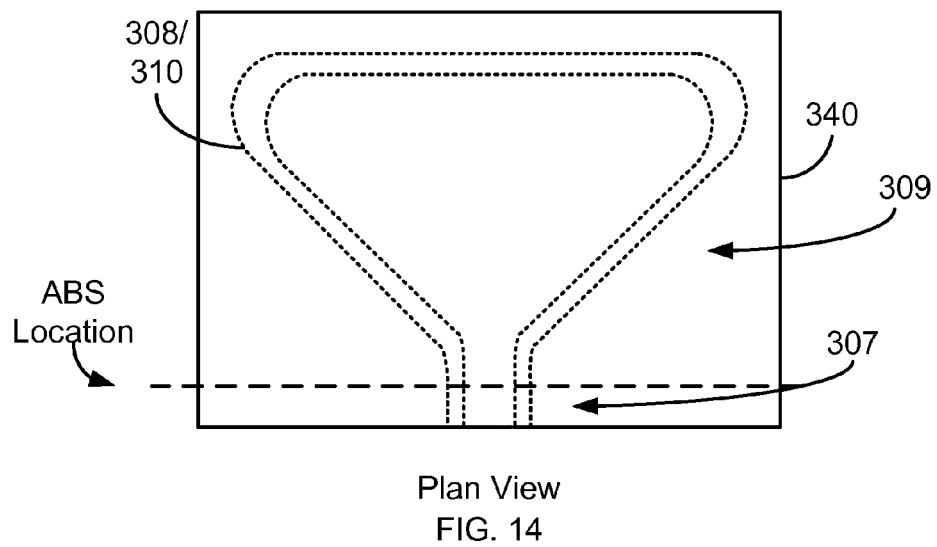
Plan View
FIG. 14

Plan View

METHOD AND SYSTEM FOR PROVIDING AN ANTIFERROMAGNETICALLY COUPLED WRITER

CROSS-REFERENCE TO RELATED APPLICATIONS

This application is a divisional of co-pending U.S. patent application Ser. No. 12/970,423, filed Dec. 16, 2010, entitled "Method and System for Providing an Antiferromagnetically Coupled Writer" assigned to the assignee of the present application and incorporated herein by reference.

BACKGROUND

FIG. 1 is a flow chart depicting a conventional method 10 for fabricating a conventional magnetic recording write transducer. For simplicity, some steps are omitted. The conventional method 10 is used for providing a magnetic write pole in an aluminum oxide layer. A trench is formed in the aluminum oxide layer, via step 12. The top of the trench is wider than the trench bottom in the region close to the ABS. As a result, the pole tip formed therein will have its top surface wider than its bottom. A seed layer is deposited, via step 14. The seed layer may be ferromagnetic or nonmagnetic. The conventional pole materials are plated, via step 16. Step 16 may include plating ferromagnetic pole materials. A chemical mechanical planarization (CMP) is then performed, via step 18. The write gap and top shield may then be deposited, via steps 20 and 22, respectively.

FIG. 2 depicts air-bearing surface (ABS) and plan views of a portion of a conventional transducer 50 formed using the conventional method 10. The conventional transducer 50 includes an underlayer 52, seed layer 54 which is deposited in the trench (not shown). The side material(s) 56 and 58 are also shown. The side material(s) 56 and 58 may be insulating, conductive, ferromagnetic and/or nonmagnetic. The pole 60, write gap 70 and top shield 80 are also shown. Thus, using the conventional method 10, the pole 60 may be formed.

Although the conventional method 10 may provide the conventional transducer 50, there may be drawbacks. The conventional pole 60 is typically formed of plated FeCo or CoFeZ, where Z is a material such as Ni, Rh, Cr, or Ru. The practical upper limit of the moment for such plated materials is approximately 2.4 T with a lower coercivity. In general, the anisotropy field for such materials is low, on the order of ten through thirty-five Oersted. As a result, such conventional poles 50 are likely to suffer from issues such as adjacent track interference (ATI), wide area track erasure (WATE), and domain lock-up (DLU). Accordingly, what is needed is an improved method for fabricating a transducer.

SUMMARY

A method and system for fabricating a magnetic transducer are described. The magnetic transducer includes a pole and a nonmagnetic intermediate layer adjacent to the pole. The pole has a paddle and a pole tip including a plurality of sidewalls. The pole includes a first magnetic pole layer, at least one antiferromagnetic coupling (AFC) structure on the first magnetic pole layer, and a second magnetic pole layer on the AFC structure(s). At least a portion of the first magnetic pole layer resides on the sidewalls of the pole tip. The paddle has a paddle width in a track width direction. The pole tip has a pole tip width in a track width direction that is less than the paddle width.

BRIEF DESCRIPTION OF SEVERAL VIEWS OF THE DRAWINGS

FIGS. 10-15 are diagrams depicting an exemplary embodiment of a magnetic recording transducer during fabrication.

DETAILED DESCRIPTION OF THE PREFERRED EMBODIMENTS

Figure 1:
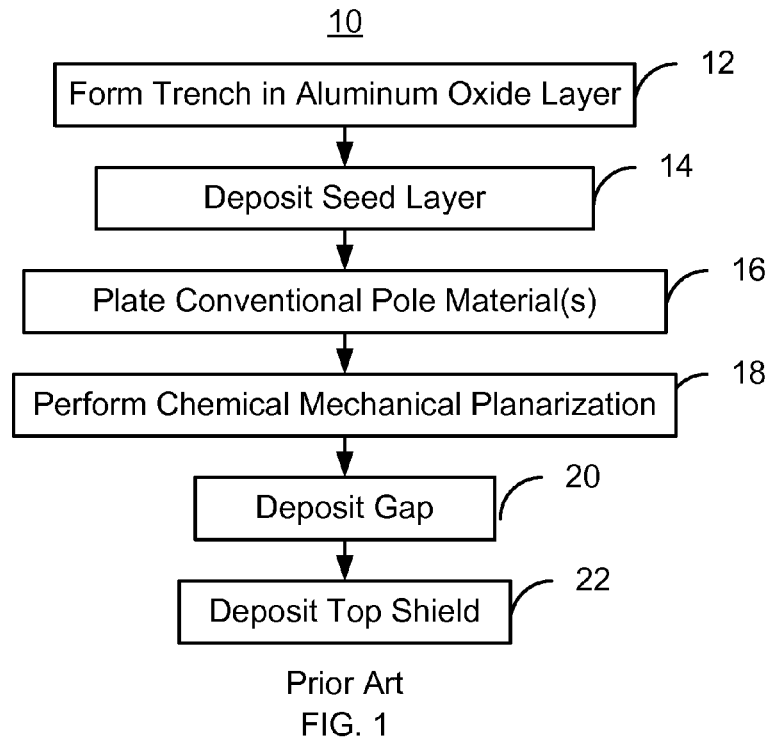
FIG. 1 is a flow chart depicting a conventional method for fabricating a write transducer.
Figure 2:
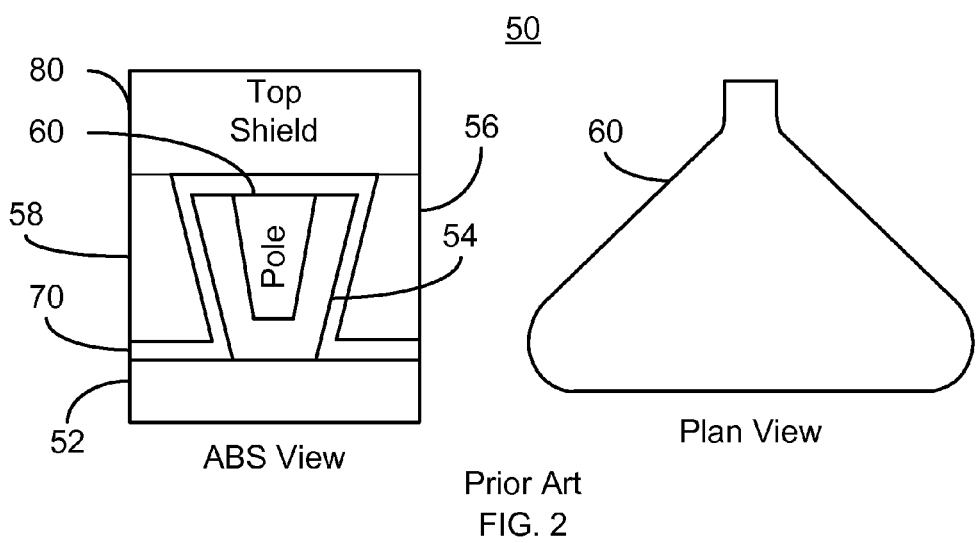
FIG. 2 is a diagram depicting plan and ABS views of a conventional write transducer.
Figure 3:
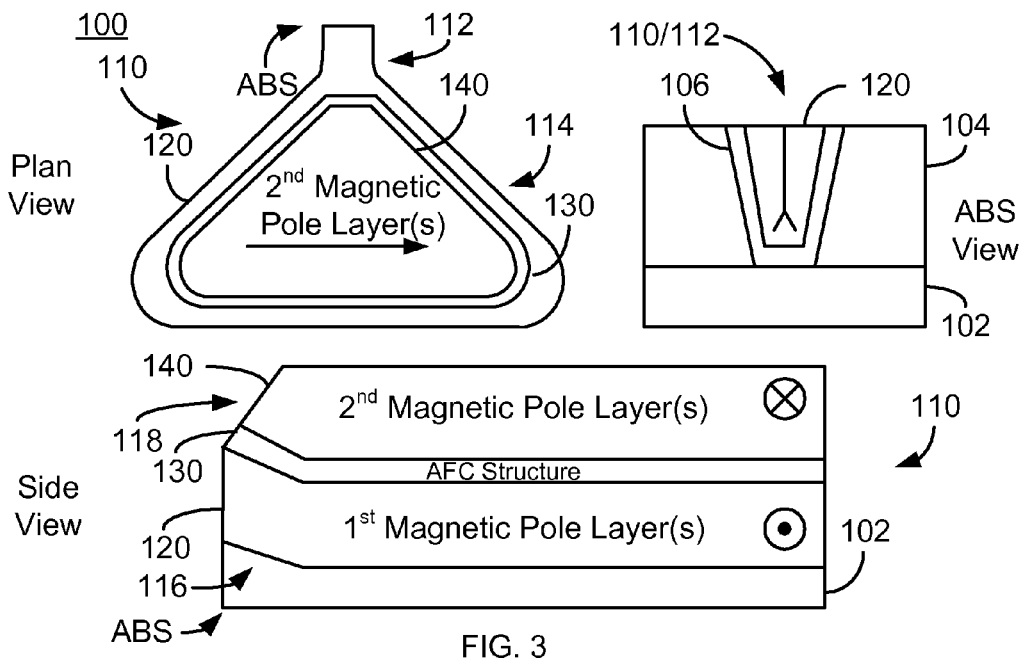
FIG. 3 is a diagram depicting an exemplary embodiment of a portion of a write transducer.

FIG. 3 is a diagram depicting an exemplary embodiment of a portion of a write transducer 100. For clarity, FIG. 3 is not to scale. FIG. 3 depicts plan, ABS, and side views of the transducer 100. The transducer 100 shown includes underlayer 102 and intermediate layer 104. The intermediate layer 104 may be removed later in processing the transducer 100. The magnetic transducer 100 also includes pole 110 residing on optional seed layer 106. In the embodiment shown, the pole 110 includes pole tip portion 112, paddle portion 114, and bevels 116 and 118. However, in other embodiments, leading edge bevel 118 and/or trailing edge bevel 116 may be omitted. As can be seen in the plan view, the pole tip portion 112 has a width in the track width direction that is less than width of the paddle portion 114.

The pole 110 includes magnetic pole layers 120 and 140 separated by antiferromagnetic coupling (AFC) structure 130. The magnetic pole layers 120 and 140 may have a high saturation magnetization and thus may include at least one of Co, Ni, and Fe. In some embodiments, the magnetic pole layers 120 and 140 may have a low anisotropy, for example not over 50 Oe. In some such embodiments, the anisotropy field is in the range of 10-35 Oe. A low coercivity may also be desired. In some embodiments, the materials used for the magnetic layers 120 and 140 are the same. However, in other embodiments, the materials used for the layers 120 and 140 may be different. In some embodiments, the ferromagnetic layers 120 and 140 may be plated. However, in other embodiments, other deposition techniques may be used. Further, the layers 120 and 140 may include sublayers. Because of the presence of AFC structure 130, the layers 120 and 140 are antiferromagnetically coupled. This can be seen in the side and plan views of FIG. 3. In some embodiments, more than two high moment layers 120 and 140 and more than one AFC structure 130 may be used. For example, two AFC structures may be interleaved with three magnetic pole layers. However, fewer AFC structure(s) 130 are generally desired so as to not dilute the moment of the pole 110. The AFC structure 130 may be used to increase the anisotropy of the layers 120 and 140. In addition, the seed layer 106 may be configured to increase the anisotropy or otherwise tailor the properties of the magnetic layers 120 and 140. In the embodiment shown, the magnetic layers 120 and 140 have substantially the same thickness. Thus, the AFC structure 130 resides in the middle of the pole 110. However, in other embodiments, the magnetic layers 120 and 140 may have different thicknesses. For example, the top magnetic layer 140 may be thinner or thicker than the bottom magnetic pole layer 120.

AFC structure 130 is used to ensure that the layers 120 and 140 are antiferromagnetically coupled. In some embodiments, the AFC structure 130 may be a simple nonmagnetic layer, such as a Ru, NiCr, or Cr layer. In some embodiments, the Ru layer is on the order of 4-10 Angstroms. In some such embodiments, the Ru layer may be 8-9 Angstroms thick. Further, other materials such as Cu and alumina may also be used as the AFC structure 130. In other embodiments, the AFC structure 130 may be a multilayer. For example, the AFC structure may include two layers of ferromagnetic material sandwiching a thin layer of nonmagnetic material. The ferromagnetic material may include materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. The nonmagnetic layer may include materials such as Ru, NiCr, and/or Cr. In other embodiments, the AFC structure 130 may include more ferromagnetic layers interleaved with nonmagnetic material(s). In general, a thinner AFC structure 130 having fewer layers is desired so as to not dilute the moment of the pole 110. By judicious selection of the materials for the ferromagnetic layers of the AFC structure 130, the AFC structure 130 may be used to increase the anisotropy of the pole 110. For example, the CoFe/Ru/CoFe multilayer described above may have an anisotropy field on the order of two thousand Oe or more. Further, the AFC structure 130 may be sputtered. In other embodiments, some or all of the AFC structure may be fabricated using other deposition technique(s).

As discussed above, the pole tip portion 112 of the pole 110 is thinner in the track width direction (left-right in the plan view) than the paddle 114. In addition, a sufficient thickness of the first magnetic pole layer 120 is provided such that the pole tip region 112 is filled by the first magnetic pole layer 120. For example, in some embodiments, the pole width in the pole tip region 110 is less than half of the paddle thickness. In addition, deposition of the first magnetic pole layer 120 may be conformal. Such a deposition also fills the pole tip region 112 from the sides as well as the bottom. As a result, the pole tip region 112 may be filled when the paddle region 114 is less than half full. In such an embodiment, a first magnetic layer 120 having a thickness of approximately half of the paddle thickness fills the pole tip region 112. Such an embodiment is depicted in FIG. 3. As is also shown in FIG. 3, in such an embodiment, the AFC structure 130 and second magnetic pole layer 140 do not reside at the ABS or in the pole tip region 112. However, layers 120, 130, and 140 all reside in the paddle 114 of the pole 110.

The pole 110 and thus the transducer 100 may have improved performance. When the pole 110 is energized, for example by write coils (not shown in FIG. 3), the narrow pole tip region 110 may be fully saturated. Further, as a high saturation magnetization material(s) of the layer 120 fill the pole, this saturation magnetization may be high. In contrast, in much of the flat region of the paddle 114 a strong antiferromagnetic coupling in the plane of the layers may be achieved. These regions may thus have a higher anisotropy, a lower coercivity and a lower saturation magnetization. Consequently, the paddle region 114 may not fully saturate. Further, when the pole 110 is not energized, the antiferromagnetic coupling between the layers 120 and 140 may dominate. Thus, the layers 120 and 140 may be antiferromagnetically coupled and have their magnetizations as shown, substantially parallel to the ABS. As a result, there may be less stray field, reduced side track erasure, reduced ATI, reduced WATE, and reduced DLU. Further, the thicknesses and materials used for the layers 120, 130, and 140 may be tailored in order to optimize various aspects of performance. Consequently, performance of the transducer 100 may be improved.

Figure 4:
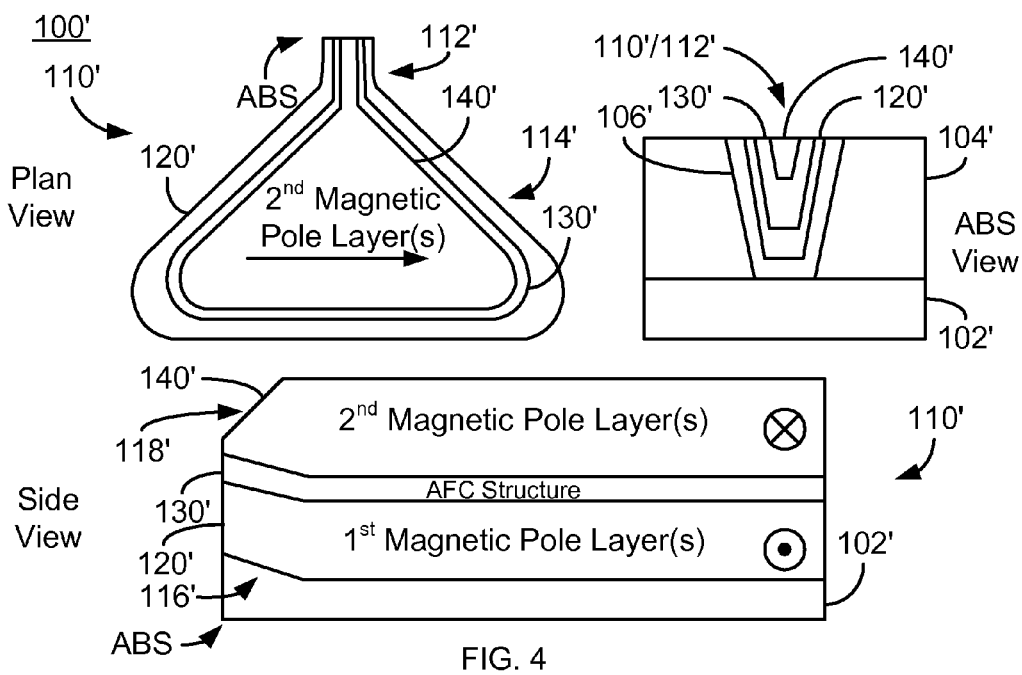
FIG. 4 is a diagram depicting another exemplary embodiment of a portion of a write transducer.

FIG. 4 depicts another exemplary embodiment of a portion of a write transducer 100'. For clarity, FIG. 4 is not to scale. FIG. 4 depicts plan, ABS, and side views of the transducer 100'. The transducer 100' is analogous to the transducer 100. Consequently, the transducer 100' shown includes underlayer 102', intermediate layer 104', optional seed layer 106', and pole 110' including pole tip portion 112', paddle portion 114', and optional bevels 116' and 118' corresponding to underlayer 102, intermediate layer 104, optional seed layer 106, and pole 110 including pole tip portion 112, paddle portion 114, and bevels 116 and 118, respectively. Further, pole 110' includes layer 120', AFC structure 130', and layer 140' corresponding to the layer 120, AFC structure 130, and layer 140, respectively. The function, materials, and structure of the components 102', 104', 106', 110', 112', 114', 116', 118', 120', 130', and 140' are thus analogous to the components 102, 104, 106, 110, 112, 114, 116, 118, 120, 130, and 140, respectively. Thus, the pole 110' and magnetic write transducer 100' may share the benefits of the pole 110 and magnetic write transducer 100, respectively.

In addition, for the pole 110' depicted in FIG. 4, a portion of the AFC structure 130' and second magnetic pole layer 140' resides in the pole tip 112'. Thus, portions of the pole tip 112' may also be antiferromagnetically coupled.

Figure 5:
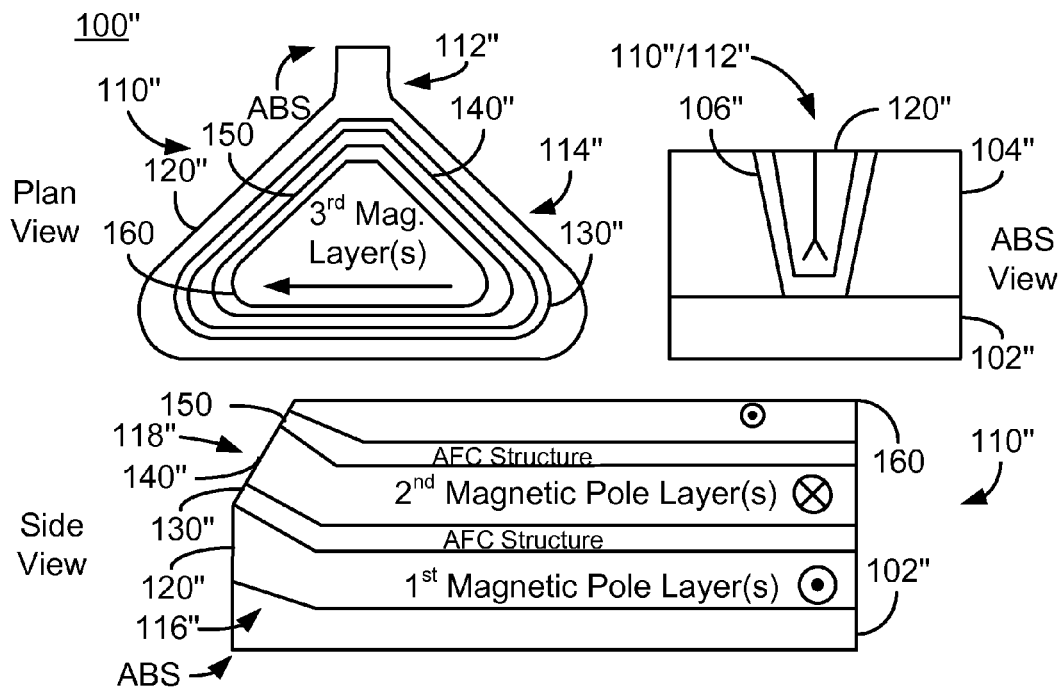
FIG. 5 is a diagram depicting another exemplary embodiment of a portion of a write transducer.

FIG. 5 depicts another exemplary embodiment of a portion of a write transducer 100". For clarity, FIG. 5 is not to scale. FIG. 5 depicts plan, ABS, and side views of the transducer 100". The transducer 100" is analogous to the transducer 100. Consequently, the transducer 100" shown includes underlayer 102", intermediate layer 104", optional seed layer 106", and pole 110" including pole tip portion 112", paddle portion 114", and optional bevels 116" and 118" corresponding to underlayer 102, intermediate layer 104, optional seed layer 106, and pole 110 including pole tip portion 112, paddle portion 114, and bevels 116 and 118, respectively. Further, pole 110" includes layer 120", AFC structure 130", and layer 140" corresponding to the layer 120, AFC structure 130, and layer 140, respectively. The function, materials, and structure of the components 102", 104", 106", 110", 112", 114", 116", 118", 120", 130", and 140" are thus analogous to the components 102, 104, 106, 110, 112, 114, 116, 118, 120, 130, and 140, respectively.

In addition, the pole 110" also includes an additional AFC structure 150 and magnetic layer(s) 160. The AFC structure 150 is analogous to the AFC structure 130'/130. Thus the AFC structure 150 may include a single nonmagnetic layer or a multilayer. Similarly, the magnetic pole layer 160 may include the same or different materials as the magnetic pole layers 120" and 140". In general, high saturation magnetization, low coercivity materials are desired. In the embodiment shown, the first magnetic pole layer 120" fills the pole tip 112". However, in other embodiments, a portion of one or more of the remaining pole component(s) 130", 140", 150, and 160 may reside in the pole tip 112". The layers 120", 140" and 160 are antiferromagnetically coupled in the paddle 114" due at least in part to the AFC structures 130" and 150. Further, the pole tip 112" may be filled by high saturation magnetization layer 120". Thus, the pole 110" and magnetic write transducer 100" may share the benefits of the pole 110 and magnetic write transducer 100, respectively.

Figure 6:
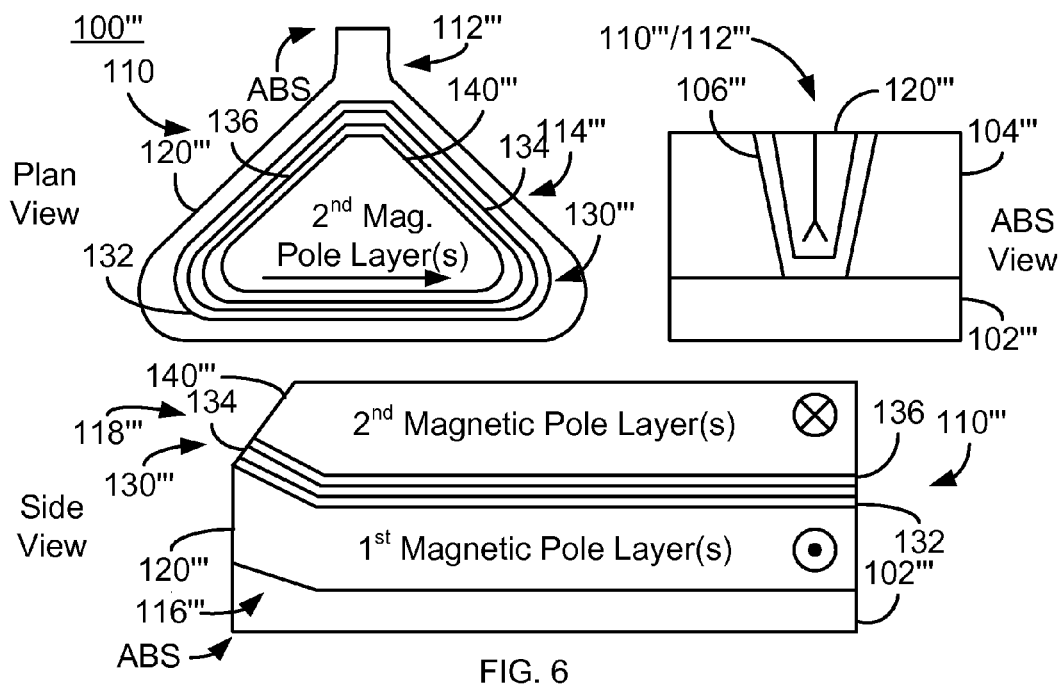
FIG. 6 is a diagram depicting another exemplary embodiment of a portion of a write transducer.

FIG. 6 depicts another exemplary embodiment of a portion of a write transducer 100'''. For clarity, FIG. 6 is not to scale. FIG. 6 depicts plan, ABS, and side views of the transducer 100'''. The transducer 100''' is analogous to the transducers 100, 100', and 100". Consequently, the transducer 100''' includes underlayer 102''', intermediate layer 104''', optional seed layer 106''', and pole 110''' including pole tip portion 112''', paddle portion 114''', and optional bevels 116''' and 118''' corresponding to underlayer 102, intermediate layer 104, optional seed layer 106, and pole 110 including pole tip portion 112, paddle portion 114, and bevels 116 and 118, respectively. Further, pole 110''' includes layer 120''', AFC structure 130''', and layer 140''' corresponding to the layer 120, AFC structure 130, and layer 140, respectively. The function, materials, and structure of the components 102''', 104''', 106''', 110''', 112''', 114''', 116''', 118''', 120''', 130''', and 140''' are thus analogous to the components 102, 104, 106, 110, 112, 114, 116, 118, 120, 130, and 140, respectively. Although not shown, the pole 110''' may also include additional AFC structure(s) (not shown) interleaved with magnetic layer(s) (not shown) in a manner analogous to the pole 110". Further, although the first magnetic layer 120''' is shown as filling the pole tip 112''', in another embodiment, a portion of one or more of the additional structure(s) 130''' and 140''' could reside in the pole tip 112'''.

In the pole 110''', the AFC structure 130''' is explicitly shown as including a multilayer. In the embodiment shown, ferromagnetic layers 132 and 136 sandwich a nonmagnetic layer 134. In some embodiments, the ferromagnetic layers 132 and 136 have a high anisotropy. For example, the ferromagnetic materials used for layers 132 and 136 may include materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. In some embodiments, the layers 132 and 136 are composed of the same materials. However, in other embodiments, the layers 132 and 136 may differ. Further, although shown as having substantially the same thickness, the layers 132 and 136 may have different thicknesses in other embodiments. The nonmagnetic layer 134 may include materials such as Ru, NiCr, and/or Cr. The nonmagnetic layer 134 is generally desired to be thin to support an antiferromagnetic coupling between the layers 132 and 136. For example, in some embodiments, the layer 132 is a Ru layer is on the order of 4-10 Angstroms thick. In some such embodiments, the Ru layer may be 8-9 Angstroms thick. However, in other embodiments, other materials and other thicknesses may be used.

Thus, the pole 110''' also includes analogous structures to the poles 110, 110', and 110". As a result, the pole 110''' and magnetic transducer 100''' may share the benefits of the magnetic pole(s) 110/110'/110" and magnetic transducer(s) 100/100'/100".

Figure 7:
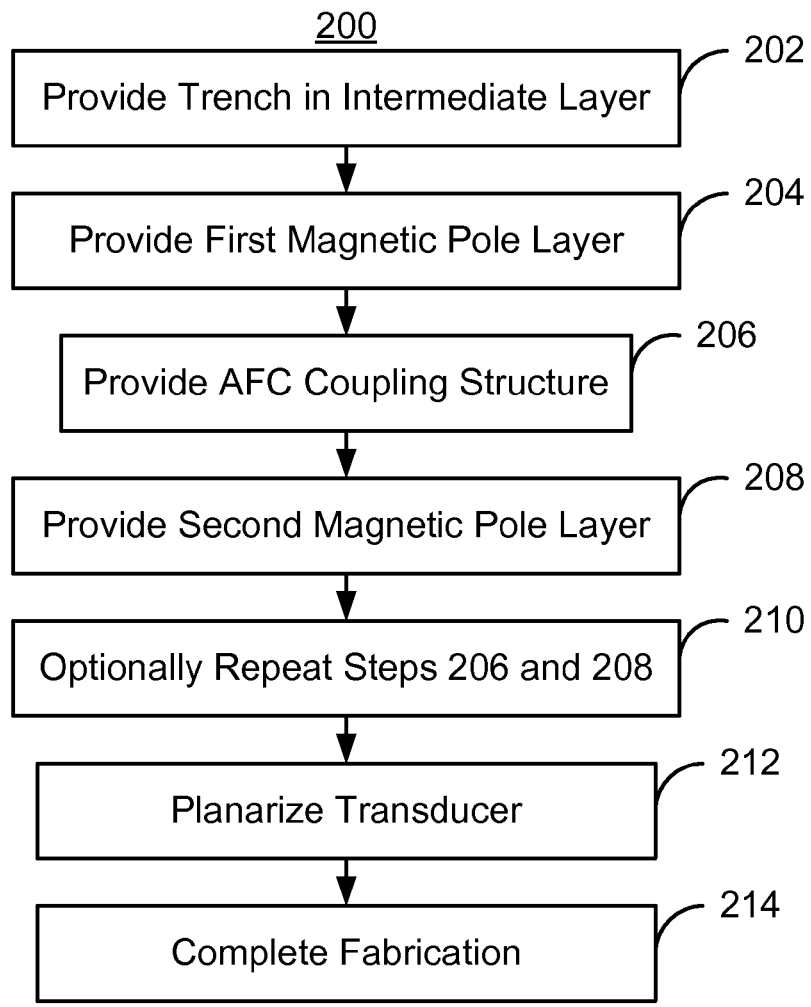
FIG. 7 is a flow chart depicting an exemplary embodiment of a method for fabricating a write transducer.

FIG. 7 is a flow chart depicting an exemplary embodiment of a method 200 for fabricating a transducer, such as the magnetic transducer 100, 100', 100", and/or 100'''. For clarity, the method 200 is described in the context of the magnetic transducer 100. For simplicity, some steps may be omitted and/or combined. The transducer being fabricated may be part of a merged head that also includes a read head (not shown) and resides on a slider (not shown) in a disk drive. The method 200 also may commence after formation of other portions of the transducer. The method 200 is also described in the context of providing a single pole and its associated structures in a single magnetic recording transducer 100. However, the method 200 may be used to fabricate multiple transducers at substantially the same time. The method 200 and system are also described in the context of particular layers. However, in some embodiments, such layers may include multiple sub-layers. In one embodiment, the method 200 commences after formation of the underlayer(s) 102 on which the pole 110 is to reside as well as a nonmagnetic intermediate layer 104. In some embodiments, the intermediate layer 104 is an aluminum oxide layer. In addition, the underlayer 102 may include an etch stop layer. Further, in some embodiments, a leading edge shield is desired. In such embodiments, the leading edge shield may be provided under the underlayer. The leading edge shield is generally ferromagnetic, magnetically soft, and may include materials such as NiFe.

A trench is formed in a portion of the intermediate layer, via step 202. Trench formation may include a reactive ion etch (RIE). The RIE may terminate in the stop layer. Thus, the trench bottom may be formed by a portion of the stop layer. However, in alternate embodiments, the trench may terminate in other layers including but not limited to the intermediate layer and an underlying shield layer. The RIE used in step 202 may be an aluminum oxide RIE. The trench has a profile and a location that correspond to the pole being formed. Thus, the trench may have a top wider than its bottom and is located where the pole is to be formed. Further, the trench has portions corresponding to the pole tip 112 and paddle 114.

The first magnetic pole layer 120 is provided, via step 204. In some embodiments, step 204 may include depositing a conductive seed layer. The seed layer may be magnetic or nonmagnetic. The first magnetic pole layer 120 may be deposited in a number of ways. In some embodiments, the first magnetic pole layer 120 is plated. In addition, step 204 may terminate after the pole tip 112 has been filled.

An AFC structure 130 is provided on the first magnetic pole layer 120, via step 206. In some embodiments, step 206 includes sputtering the AFC structure 130. Sputtering the AFC structure 130 may ensure that the interfaces in the AFC structure are smoother. This may improve the antiferromagnetic coupling desired. However, in other embodiments, other deposition methods such as plating may be used. Step 206 may include depositing a nonmagnetic layer or a multilayer that may include ferromagnetic layers. In some embodiments, the AFC structure provided in step 206 may only reside in the paddle portion once fabrication is completed. However, in other embodiments, the AFC structure provided in step 206 may also reside in the pole tip region.

The second magnetic pole layer 140 is provided, via step 208. The second magnetic pole layer 140 may be deposited in a number of ways. In some embodiments, the second magnetic pole layer 140 is plated.

Step 206-208 may optionally be repeated, via step 210. In such embodiments, the pole 110 provided would have more than the layers depicted in FIG. 3. Referring back to FIG. 7, once the layers for the pole 110 have been provided, the transducer is planarized, via step 212. In some embodiments, step 212 includes performing a chemical mechanical planarization (CMP). Fabrication of the transducer 100 may then be completed, via step 214. For example, bevel 118 may be formed and/or additional structures such as write gaps, shield(s) and coil(s) may be provided.

Using the method 200, pole 110 having the desired geometry and coupling between the layers 120 and 140 may be fabricated. The benefits of the magnetic transducer 100 and pole 110 may be achieved. Performance of the magnetic transducer 100 may thus be enhanced.

Figure 8:
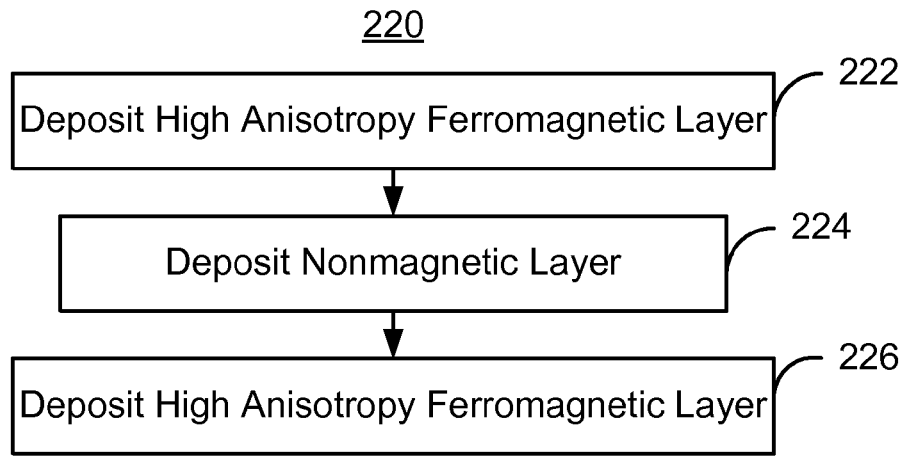
FIG. 8 is a flow chart depicting an exemplary embodiment of a method for fabricating an antiferromagnetic coupling structure.

FIG. 8 is a flow chart depicting an exemplary embodiment of a method 220 for fabricating an AFC structure, such as the AFC structure 130'''. The method 220 may be used in methods for fabricating a pole and/or transducer. For example, the method 220 may be used in the step(s) 206 and/or 210. For clarity, the method 220 is described in the context of the AFC structure 130'''. For simplicity, some steps may be omitted and/or combined. The method 220 is also described in the context of providing a single AFC structure 130'''. However, the method 220 may be used to fabricate multiple AFC structures at substantially the same time. The method 220 and system are also described in the context of particular layers. However, in some embodiments, such layers may include multiple sub-layers.

A high anisotropy ferromagnetic layer 132 is deposited, via step 222. In some embodiments, step 222 occurs after an optional ion mill is performed on the underlying magnetic layer 120'''. Such an ion mill may be performed to preclean the top surface of the magnetic layer 120'''. In some embodiments, step 222 includes sputtering a layer including materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd.

A nonmagnetic layer 134 is deposited to a desired thickness, via step 224. The thickness selected in step 224 is such that the desired magnetic coupling is provided between the layers 132 and 136. In some embodiments, step 224 includes sputtering a Ru layer However, in other embodiments, other processes and/or other materials may be used.

Another high anisotropy ferromagnetic layer 136 is deposited, via step 226. In some embodiments, step 226 includes sputtering a layer including materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd.

Using the method 220, a high anisotropy AFC coupling structure 130''' may be provided. Thus, the performance of a pole 110''' and magnetic transducer 100''' using such a structure may be enhanced.

Figure 9:
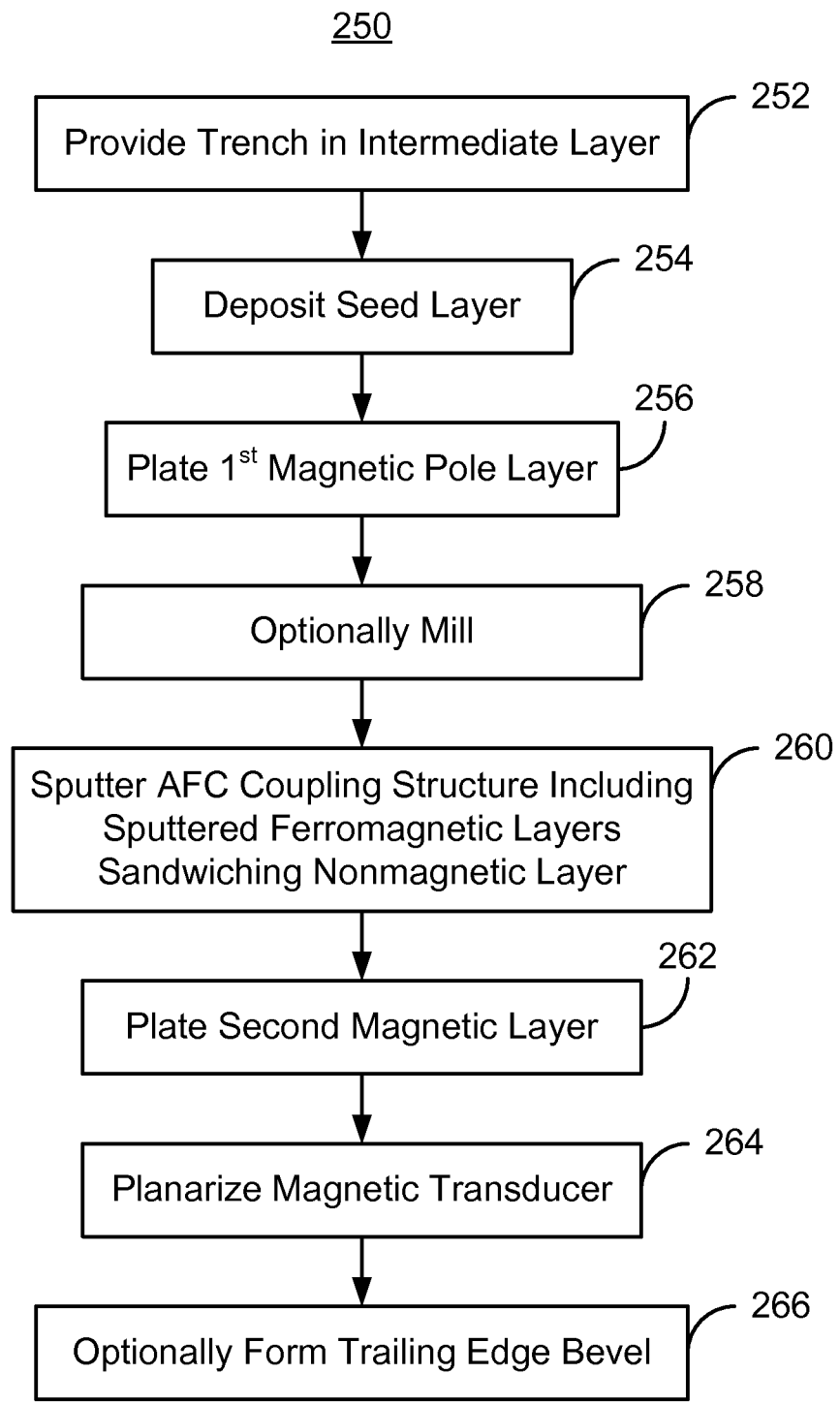
FIG. 9 is a flow chart depicting another exemplary embodiment of a method for fabricating a write transducer.

FIG. 9 is a flow chart depicting another exemplary embodiment of a method 250 for fabricating a magnetic write transducer. For simplicity, some steps may be omitted. FIGS. 10-15 are diagrams depicting side, ABS, and plan views of an exemplary embodiment of a portion of a transducer during 300 fabrication. For clarity, FIGS. 10-15 are not to scale. The side views in FIGS. 10-15 are taken in the middle of the location at which the pole is formed. Further, although FIGS. 10-15 depict the ABS location (location at which the ABS is to be formed) and ABS at a particular point in the pole, other embodiments may have other locations for the ABS. Referring to FIGS. 9-15, the method 250 is described in the context of the transducer 300. However, the method 250 may be used to form another device (not shown). The transducer 300 being fabricated may be part of a merged head that also includes a read head (not shown in FIG. 10-15) and resides on a slider (not shown) in a disk drive. The method 250 also may commence after formation of other portions of the transducer 300. The method 250 is also described in the context of providing a single transducer 300. However, the method 250 may be used to fabricate multiple transducers at substantially the same time. The method 250 and device 300 are also described in the context of particular layers. However, in some embodiments, such layers may include multiple sublayers.

In one embodiment, the method 200 commences after formation of the leading shield 302 and underlayer(s) 304 on which the pole is to reside as well as a nonmagnetic intermediate layer 306. In some embodiments, the intermediate layer 306 is an aluminum oxide layer. In addition, the underlayer 304 may include an etch stop layer. The leading shield 302 is generally ferromagnetic, magnetically soft, and may include materials such as NiFe.

A trench is formed in a portion of the intermediate layer, via step 252. Trench formation may include a RIE that may terminate in the stop layer. Thus, the trench bottom may be formed by a portion of the stop layer. However, in alternate embodiments, the trench may terminate in other layers including but not limited to the intermediate layer and an underlying shield layer. The RIE used in step 252 may be an aluminum oxide RIE. The trench has a profile and a location that correspond to the pole being formed.

Figure 10:
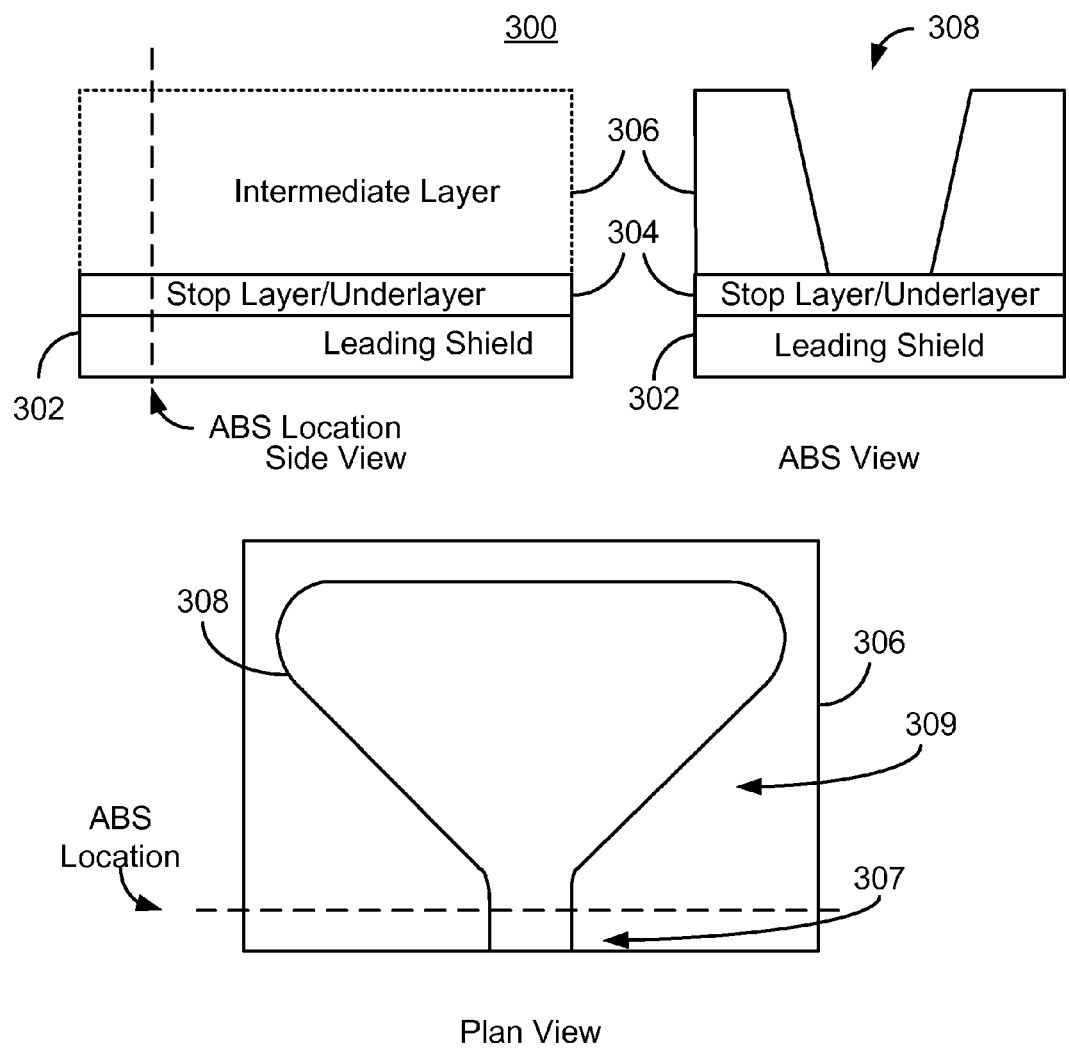

FIG. 10 depicts the transducer 300 after step 252 is performed. Thus, a leading shield 302 and stop layer/underlayer 304 are shown. Intermediate layer 306 having trench 308 therein are also shown. The trench 308 has a top wider than its bottom and is located where the pole is to be formed. Further, the trench has a pole tip portion 307 and a paddle portion 309 corresponding to the pole tip and paddle. In the embodiment shown, the trench 308 terminates at the underlayer 304. However, in other embodiments, the trench 308 may terminate in the leading shield 302.

Figure 11:
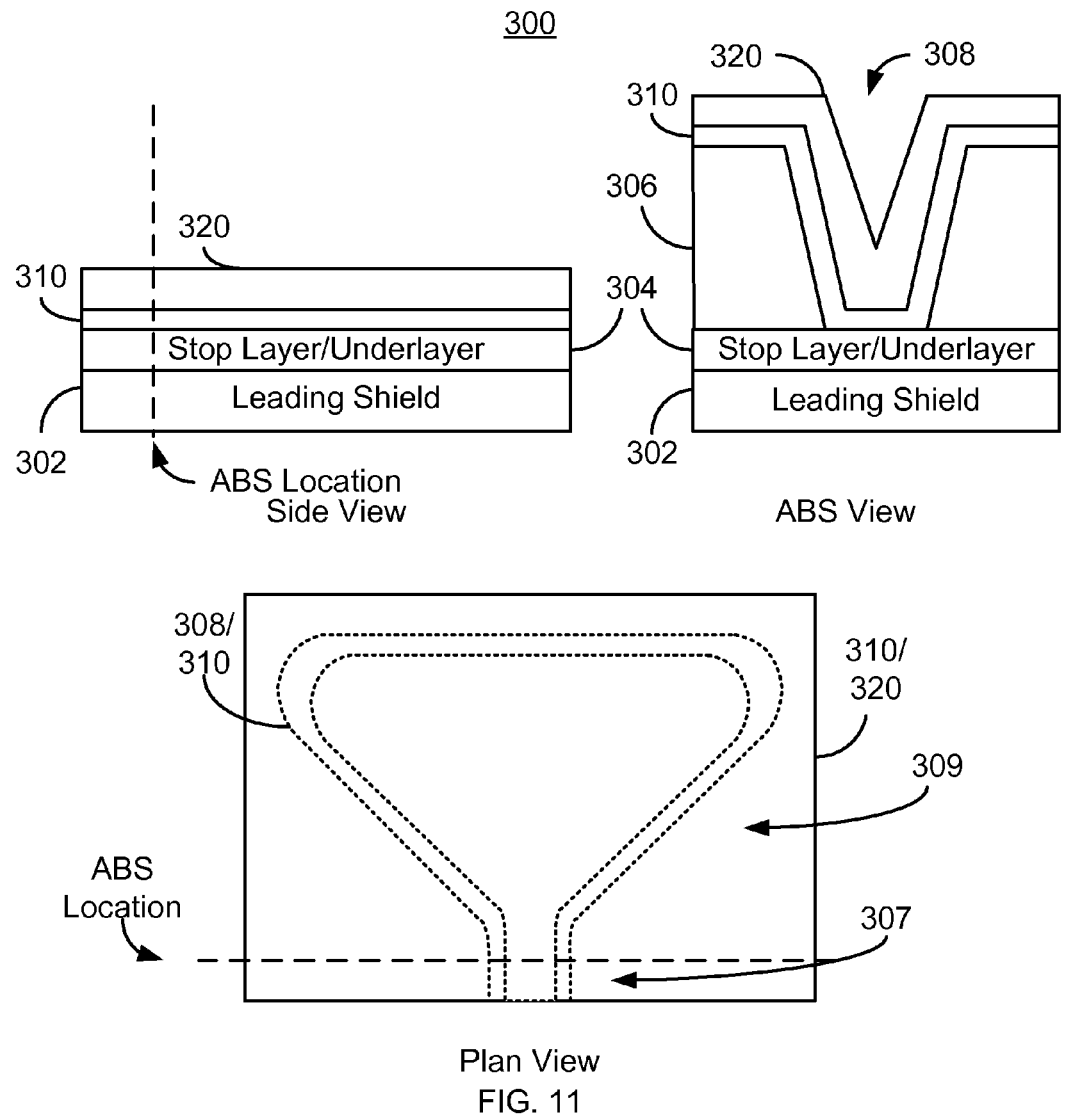
Figure 13:
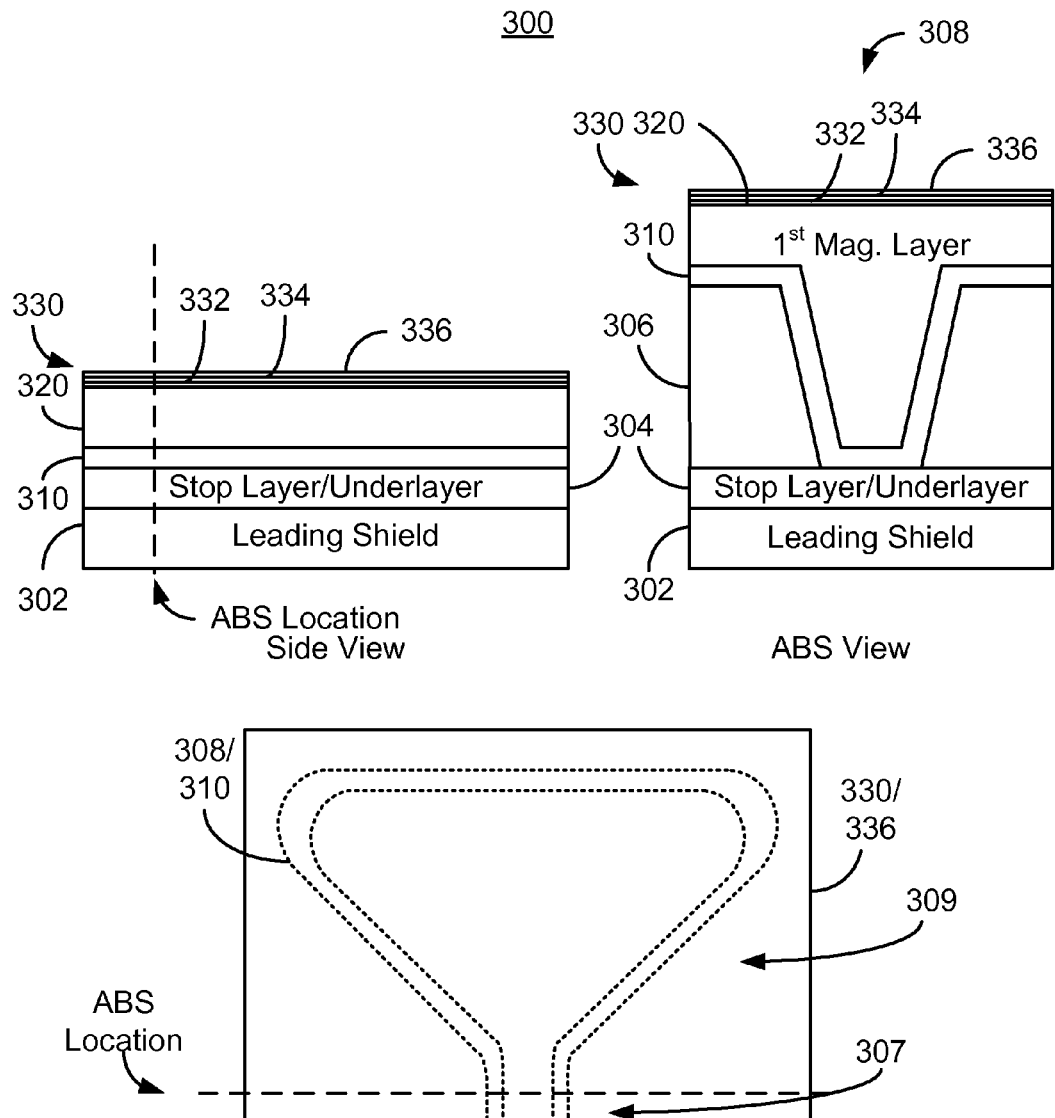

A conductive seed layer is deposited, via step 254. The first magnetic pole layer is plated, via step 256. FIG. 11 depicts the transducer 300 during step 256. Thus, seed layer 310 and a portion of the first magnetic pole layer 320 are shown. As can be seen in the ABS view, the pole tip portion 307 of the trench proximate to the ABS location fills faster than the paddle portion 309 distal from the ABS. FIG. 12 depicts the transducer 300 after step 256 is completed. Step 256 has been terminated after the pole tip portion 307 of the trench 308 has been filled. Thus, the first magnetic layer 320 has been provided. In the embodiment shown, no leading edge bevel is formed. However, in another embodiment, a leading edge bevel is provided, for example by shaping the trench 308. The first magnetic layer 320 is optionally milled or otherwise precleaned, via step 258. An AFC structure is sputtered on the first magnetic pole layer 320, via step 260. In some embodiments, step 260 includes sputtering high anisotropy magnetic layers sandwiching a nonmagnetic conductive layer. FIG. 13 depicts the transducer 300 after step 260 is performed. Thus, AFC structure 330 including layers 332, 334, and 336 has been formed. The laser 332 and 336 are ferromagnetic layers that may have a high anisotropy. Thus, layers 332 and 336 may include at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. Layer 334 is a conductive, nonmagnetic layer such as Ru.

Figure 15:
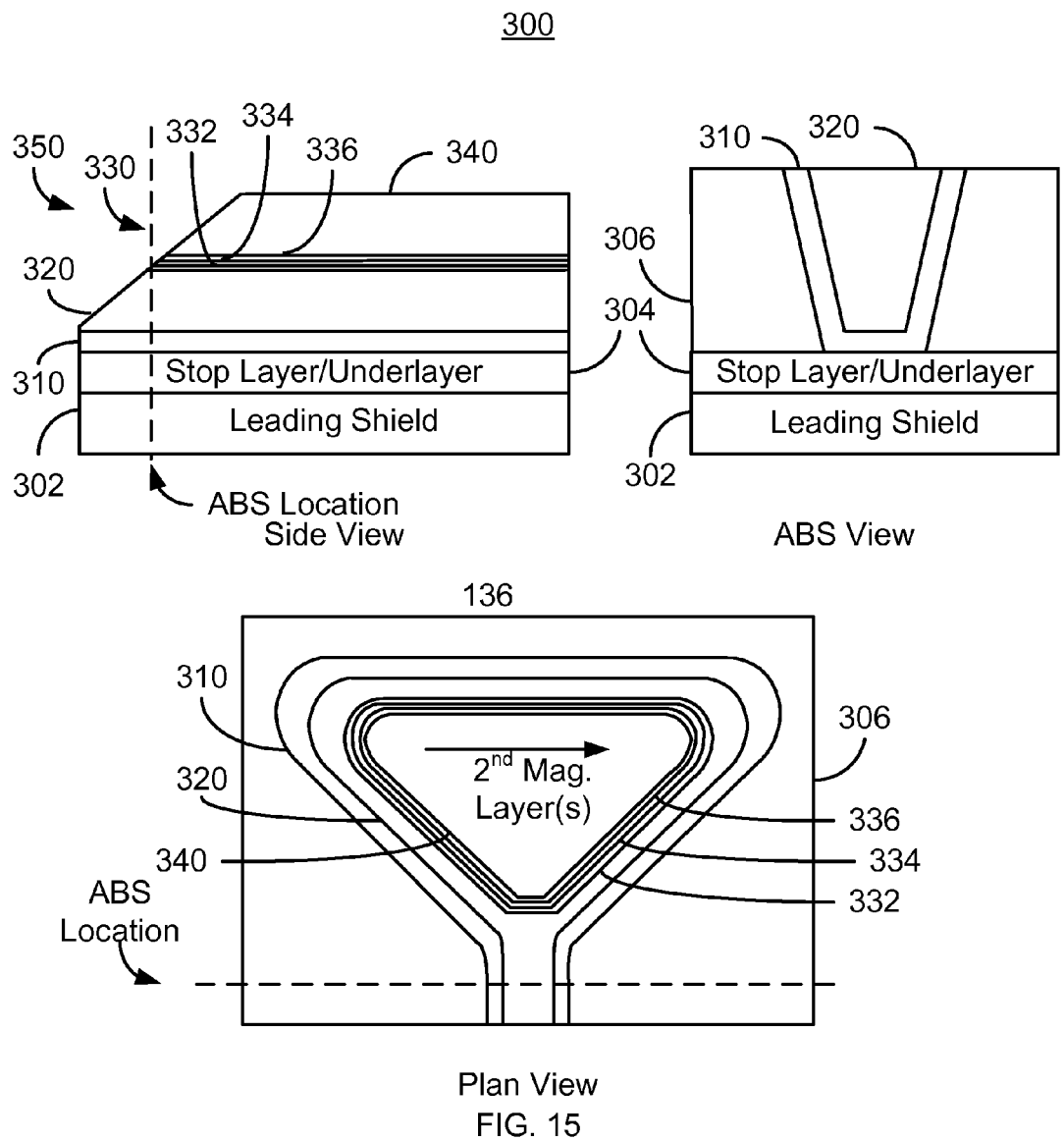

The second magnetic pole layer is plated, via step 262. FIG. 14 depicts the transducer 300 after step 262 is performed. Thus, a second magnetic layer 340 is shown. The transducer is planarized, via step 264. In some embodiments, step 264 includes performing a CMP. A trailing edge bevel may be formed, via step 266. FIG. 15 depicts the transducer 300 after step 266 is performed. Thus, bevel 350 is shown. Fabrication of the transducer 300 may then be completed.

Using the method 250, the magnetic transducer 300 analogous to the transducers 100, 100', 100'', and 100''' may be formed. The benefits of the magnetic transducers 100, 100', 100'', and 100''' may be achieved. Performance of the magnetic transducer 300 may thus be enhanced.

We claim:

1. A method for fabricating a magnetic write transducer having an intermediate layer, the intermediate layer being nonmagnetic, the method comprising:

providing a trench in the intermediate layer, the trench having a paddle region, a pole tip region, a profile, and a location corresponding to a pole of the magnetic transducer, the paddle region having a paddle width in a track width direction, pole tip region having a pole tip width in a track width direction that is less than the paddle width;

providing a first magnetic pole layer in the trench, the first magnetic pole layer covering the sidewalls of the pole tip region;

providing at least one antiferromagnetic coupling (AFC) structure on the first magnetic pole layer; and providing a second magnetic layer on the at least one AFC structure;

planarizing the magnetic transducer, a remaining portion of the first magnetic pole layer, a remaining portion of the at least one AFC structure, and a remaining portion of the second magnetic pole layer forming the pole, the remaining portion of the at least one AFC structure residing only in the paddle of the pole, and the remaining portion of the first magnetic pole layer substantially filling the pole tip such that the pole tip is ferromagnetic.

2. The method of claim 1 wherein the step of providing each of the at least one AFC structure further includes:
   depositing a nonmagnetic layer.

3. The method of claim 2 wherein the step of depositing the nonmagnetic layer further includes:
   sputtering the nonmagnetic layer.

4. The method of claim 3 wherein the nonmagnetic layer includes at least one of Ru, NiCr, and Cr.

5. The method of claim 3 wherein the step of providing each of the at least one AFC structure further includes:
   depositing a first ferromagnetic layer; and
   depositing a second ferromagnetic layer, the nonmagnetic layer residing between the first ferromagnetic layer and the second ferromagnetic layer.

6. The method of claim 5 wherein the step of depositing the first ferromagnetic layer further includes:
   sputtering the first ferromagnetic layer; and
   wherein the step of depositing the second ferromagnetic layer further includes sputtering the second ferromagnetic layer.

7. The method of claim 1 wherein the first magnetic pole layer has a first thickness and a second magnetic pole layer has a second thickness less than the first thickness.

8. The method of claim 1 wherein the first magnetic pole layer has a first thickness and a second magnetic pole layer has a second thickness greater than the first thickness.

9. The method of claim 1 wherein the first magnetic pole layer has a first thickness and a second magnetic pole layer has a second thickness substantially equal to the first thickness.

10. A method for fabricating a magnetic transducer having an intermediate layer, the intermediate layer being nonmagnetic, the method comprising:
   providing a trench in the intermediate layer, the trench having a paddle region, a pole tip region, a profile, and a location corresponding to a pole of the magnetic transducer, the paddle region having a paddle width in a track width direction, pole tip region having a pole tip width in a track width direction that is less than the paddle width;
   plating a first magnetic pole layer in the trench, the first magnetic pole layer substantially filling the pole tip region;
   sputtering at least one antiferromagnetic coupling (AFC) structure on the first magnetic pole layer, each of the at least one AFC structure including at least a first ferromagnetic layer, a second ferromagnetic layer, and a nonmagnetic layer between the first ferromagnetic layer and the second ferromagnetic layer, the nonmagnetic layer including Ru, the first ferromagnetic layer and the second ferromagnetic layer including at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd;
   plating a second magnetic layer on the at least one AFC structure;
   planarizing the magnetic transducer, a remaining portion of the first magnetic pole layer, a remaining portion of the at least one AFC structure, and a remaining portion of the second magnetic pole layer forming the pole, the remaining portion of the at least one AFC structure residing only in the paddle of the pole, and the remaining portion of the first magnetic pole layer substantially filling the pole tip such that the pole tip is ferromagnetic.

* * * * *